UNITED STATES PATENT OFFICE.

JESSE PETERSON, OF LOCKPORT, NEW YORK, ASSIGNOR TO THE UNITED INDURATED FIBRE COMPANY, OF LOCKPORT, NEW YORK, A CORPORATION OF NEW JERSEY.

PROCESS OF INDURATING FIBER-WARE, &c.

SPECIFICATION forming part of Letters Patent No. 696,379, dated March 25, 1902.

Application filed February 17, 1897. Serial No. 623,784. (No specimens.)

*To all whom it may concern:*

Be it known that I, JESSE PETERSON, of Lockport, county of Niagara, and State of New York, have invented an Improvement in Processes of Indurating Fiber-Ware, &c., of which the following description is a specification.

The present invention relates to a process of indurating or toughening fiber, such as wood-pulp or paper, which has been previously shaped or molded to form articles, such as pails or the like; and it consists in treating such articles with a filler having as its essential ingredient corn-oil, to which is preferably added some toughening substance, such as creosote, resin, or a suitable gum or gums, in which filler the articles are dipped until the pores are filled or permeated and then afterward baked or subjected to heat to harden the filler.

The invention further consists in the process of finishing the articles, which are sanded and afterward given the desired gloss and rendered waterproof by applying to the surface thereof a suitable baking-varnish and then baking them to harden the varnish.

Indurated fiber-ware of the kind above described has been heretofore prepared by using fillers of various kinds, a filler consisting of cotton-seed oil or linseed-oil and resin being probably most commonly used. This filler, however, has been found objectionable, owing to the fact that when the temperature is low the composition hardens when the article is taken out of the dipping-vat and does not penetrate as it should, it being found, moreover, that articles treated and finished in this way are not perfectly waterproof when subjected to the action of a liquid at a high temperature, since the resin when used with linseed or cotton-seed oil is liable to soften.

The present invention gives better results owing to the fact that the corn-oil used in accordance therewith not only thoroughly penetrates the fiber, but also indurates or toughens the same to a greater extent than the fillers heretofore used and is also perfectly waterproof up to the boiling-point.

In carrying out the invention I use as a filler a quantity of corn or maize oil, (these being different names under which substantially the same article is known commercially,) preferably mixed with a toughening medium, such as creosote, the corn-oil, however, being the essential ingredient, while the other ingredients may be varied, as stated, it being desirable in some cases to add a small quantity of drier. The article, which has been properly molded or formed from the pulp, is then dipped in the liquid filler, prepared as above described, the said liquid being heated, and the article is then withdrawn and baked or subjected to heat, which thoroughly hardens the oil that has penetrated and filled the pores in the dipping process. After the article is cooled and dried it is sanded in order to give the proper smooth finish. So far as the actual induration or toughening of the fiber is concerned the process is now complete and the article ready to be finished, the finishing process consisting, essentially, of applying a suitable baking-varnish to the surface to give the desired gloss and aid in protecting the material, the article being preferably dipped in the said varnish and afterward baked. In this way a very handsome finish is obtained as well as a perfectly waterproof finish and one which will stand any degree of temperature to which it is likely to be subjected while in use—viz., any temperature up to and including 212° Fahrenheit.

I claim—

1. The process of indurating or toughening fiber articles, consisting in dipping such articles in a filler composed of corn-oil and a toughening medium, and then baking them, substantially as described.

2. The process of indurating or toughening fiber articles, consisting in dipping such articles in a filler composed of corn-oil and a toughening medium, and then baking them, and finally sanding, varnishing and again baking them, substantially as described.

In testimony whereof I have signed my name to this specification in the presence of two subscribing witnesses.

JESSE PETERSON.

Witnesses:
F. P. ARMSTRONG,
CHAS. E. FOLGER.